Dec. 15, 1942.    C. I. GIBBS    2,304,906
PRESSURE OPERATED GAS CONTROL VALVE
Filed Nov. 8, 1940    2 Sheets-Sheet 2
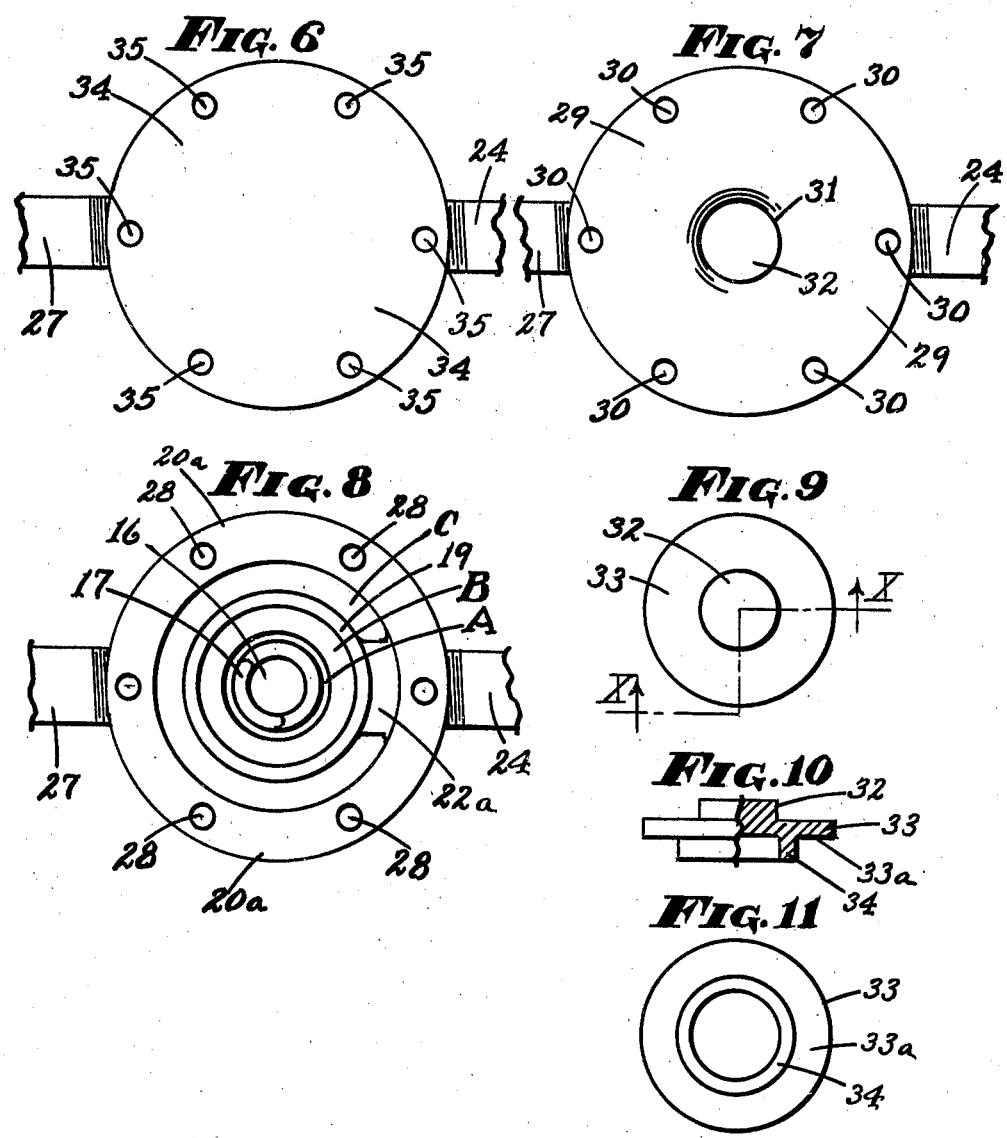
INVENTOR.
Cornelius I. Gibbs
BY M. Y. Charles
ATTORNEY.

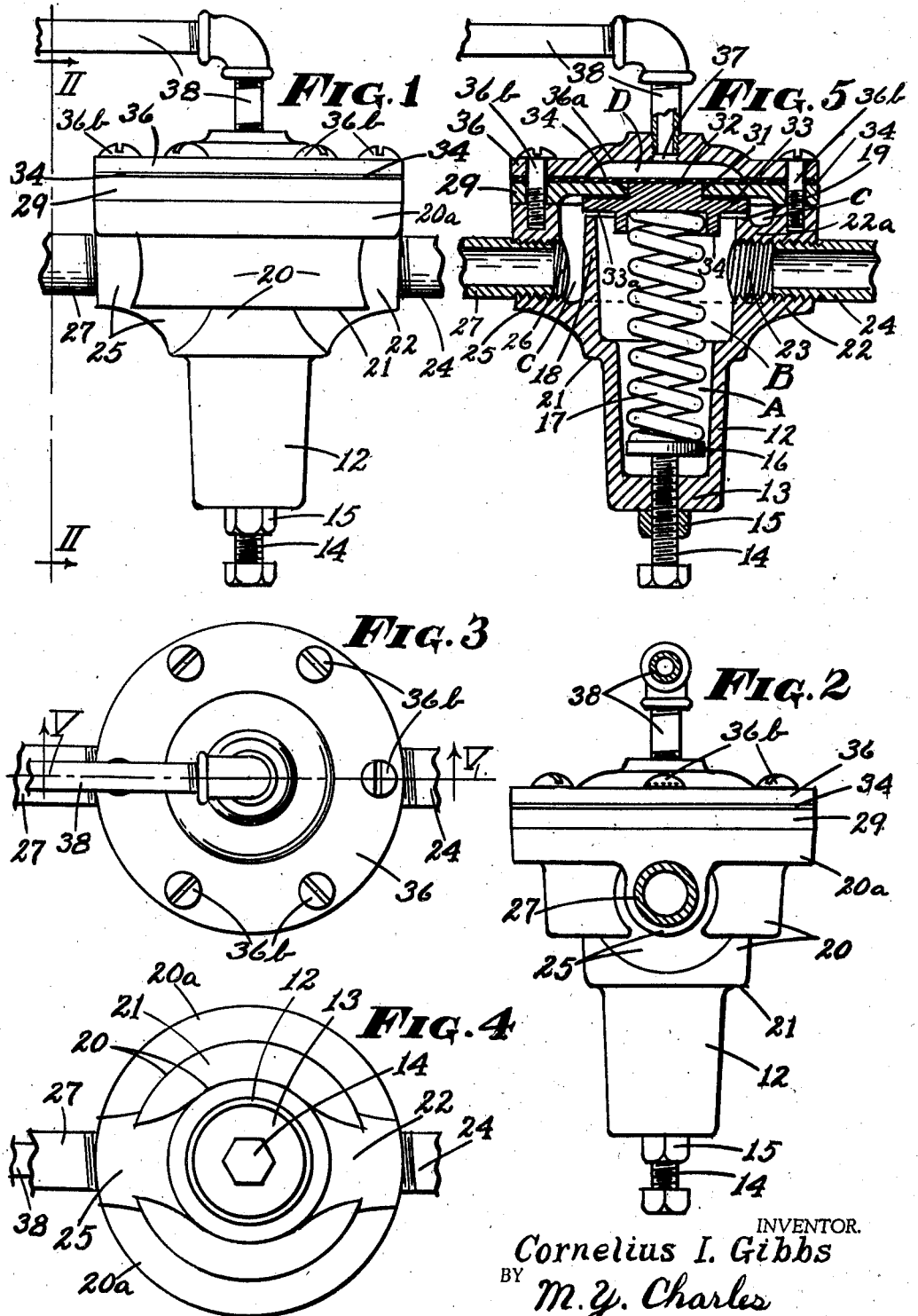

Patented Dec. 15, 1942

2,304,906

UNITED STATES PATENT OFFICE 2,304,906

PRESSURE OPERATED GAS CONTROL VALVE

Cornelius I. Gibbs, Eldorado, Kans.

Application November 8, 1940, Serial No. 364,935

1 Claim. (Cl. 137—153)

· My invention relates to pressure operated gas control valves. The object of my invention is to provide a pressure operated valve for the control of gas fuel that is being consumed to maintain a constant steam pressure, or other pressures produced and maintained by heat from a gas flame. A further object is to provide a valve of the kind mentioned that is sensitive to small changes of pressure. A still further object is to provide a valve of the kind mentioned that is adjustable for operation within reasonably small limits of operating pressure. Another object is to provide a valve of the kind mentioned that can be easily changed for operation under a low pressure to operation under a high pressure or vice versa. Still another object is to provide a valve of the kind mentioned that is simple, easy and cheap to make, one that is substantial and long lived and one that contains few parts and a very small amount of moving parts, and the movement of those parts that do move is very slight. A still further object is to provide a valve of the kind mentioned in which the area against which the pressure operates may be varied in comparison to the area against which the gas pressure is exerted. These and other objects will be more fully described as this description progresses.

Now referring to the accompanying drawings:

Fig. 1 is a side view of my improved pressure operated gas control valve.

Fig. 2 is an end view of my improved pressure operated gas control valve as seen from the line II—II in Fig. 1 and looking in the direction of the arrows.

Fig. 3 is a top plan view of my improved pressure operated gas control valve.

Fig. 4 is a bottom plan view of my improved pressure operated gas control valve.

Fig. 5 is a detail sectional view through my improved pressure operated gas control valve, the view being taken along the line V—V in Fig. 3 and looking in the direction of the arrows.

Fig. 6 is a top plan view of my improved pressure operated gas control valve, the top plate thereof being removed.

Fig. 7 is a top plan view of my improved pressure operated gas control valve, the top plate and sealing membrane thereof being removed for convenience of illustration.

Fig. 8 is a top plan view of my improved pressure operated gas control valve, the top plate, sealing membrane, and valve positioning plate being removed for purposes of illustration.

Fig. 9 is a top plan view of the movable valve element.

Fig. 10 is a side and sectional view through the movable valve element, the view being taken along the line X—X in Fig. 9 and looking in the direction of the arrows.

Fig. 11 is a bottom plan view of the movable valve element.

Similar numerals of reference designate the same parts throughout the several figures of the drawings.

In the drawings is shown my improved pressure operated gas control valve which is provided with a spring chamber A defined by a cylindrically shaped housing having an integrally formed bottom or closure 13 through which is threaded an adjusting screw 14 which is positioned on the center axis of the chamber A, and on which is threaded a lock nut 15 in engaging relationship to the closure portion 13 for the purpose of locking the adjusting screw 14 in its adjusted positions as will be readily understood.

On the inner end of the adjusting screw 14 and in the chamber A is supported a plate 16 on which rests one end of a helical compression spring 17.

At B is shown a gas receiving chamber that connects with the open end of the chamber A and is defined by the cylindrically shaped wall 18, the upper edge of which forms a circular valve seat 19. At C is a gas discharge chamber enclosing the chamber B and defining wall 18 thereof, and is defined by an outside housing wall 20 which closes in as at 21 at the bottom thereof and integrally joins the housing wall 12 of the chamber A and the bottom edge of the defining wall 18 of the chamber B in such a manner as to form a continuous open top chamber of the two chambers A and B that are separated from the chamber C by the wall 18.

At 22 is a boss on the outside of the housing wall 20, and in the chamber C the boss 22 continues as portion 22a that integrally joins the walls 20 and 18 of the chambers B and C. The boss 22—22a is provided with a hole 23 that passes therethrough to provide an opening from the chamber B to the outside of the valve device. The wall of the hole 23 is threaded so as to receive the threaded end of a gas feed or supply pipe 24.

At 25 is a second boss on the outside of the housing wall 20 and which is provided with a hole 26 that passes therethrough to provide an opening from the chamber C to the outside of the valve device. The wall of the hole 26 is threaded to receive the threaded end of a gas transmission pipe 27. The upper edge of the wall 20 is provided with an outwardly extending flange like portion 20a that is provided with threaded screw or bolt holes 28 to receive screws or bolts as will later be described.

At 29 is a valve guide plate that is approximately the same outside diameter as the flange 20a. The valve guide plate is provided with holes 30 therethrough that are so positioned that they register with the screw holes 28 in the flange 20a when the valve guide plate 29 is properly positioned on the flange 20a and over the chambers B and C. In so placing the valve guide plate 29 there is a considerable space left between the valve seat 19 and the valve guide plate 29, the object of which will later be made obvious. In the center of the valve guide plate 29 is a hole 31 in which is slidably positioned a piston like portion 32 that is integrally formed on the valve portion 33, the under face 33a of the valve element 33 is ground smooth for valve closure purposes as will be later described. The under side of the valve element 33 is provided with an annular downwardly extending flange like element 34 to form a seat to receive the upper end of the helical compression spring 17 as will later be mentioned.

The valve element 33 is positioned over the chamber B in such relationship to the chamber B and the valve seat 19 on the top of the wall 18 around the chamber B so as to be seated on the valve seat 19 to close the passage between the chamber B and C. The valve 33 is movable away from and toward the valve seat 19 and between the valve seat 19 and the valve guide plate 29. The upper edge of the metal around the hole 31 is rounded so as to protect a sealing membrane 34 as will later be described.

At 34 is a flexible, preferably rubber sealing membrane that is made in one solid piece of approximately the same diameter as the valve guide plate 29. The sealing membrane is provided with a series of holes 35 which, when the sealing membrane 34 is properly positioned over the valve guide plate, will register with the holes 30 in the valve guide plate 29.

At 36 is a top plate having a recessed portion 36a which in combination with the sealing membrane 34 forms a chamber D into which opens a passage 37 into which is threaded one end of a pipe line 38 the other end of which connects to the steam dome of a boiler, or other suitable container.

The plate 36 is provided with a plurality of holes so positioned therein that they will register with the holes 35, 30 and 28 in the elements 34, 29 and 20a. At 36b is shown screws that pass through the holes in the plate 36 and the holes 35 and 30 and are threaded into the holes 38 so as to provide a rigid and tight assembly of the plate 36, membrane 34 and plate 29 on the flange 22a of the housing 20.

The proportion of the device as shown in the drawings is designed for operation under a medium high pressure; that is, the area of the surface of the piston 32 is rather small. Now if the working pressure is to be low, the plate 29, and valve and piston 33—32 would be exchanged for similar parts in which the area of the piston head is increased in size. By varying the size of the area of the piston head the valve device may be made to accommodate a large range of operating pressure in the chamber D without changing the spring 17.

Attention is also called to the fact that the valve 33 and valve seat 19 and the chamber B are extremely large in diameter in comparison to the size of the feed pipe 24 and discharge pipe 27. This is for the reason that the valve device may be closed or opened to the full capacity of the feed pipe 24 and discharge pipe 27 with an extremely small movement of the valve 33.

The operation of the device is as follows: We will consider that the pressure operated gas control valve is being used to control the heat that is being applied to a boiler to maintain a certain predetermined pressure of steam therein.

Before the fire is started there is no steam pressure, therefore the pressure operated gas control valve stands in an open position to admit a full flow of gas fuel through the feed pipe 24 into the chamber B and between the valve 33 and the valve seat 19 into the chamber C and through the pipe 27 to the gas burner. Now the gas fire is started in the boiler, and as the water in the boiler becomes heated, steam pressure will be produced in the boiler and pipe lines connected therewith which includes the pipe line 38 shown in the drawings. The steam transmitted by the pipe line 38 is discharged into the chamber D where the pressure of the steam is exerted against the sealing membrane 34 through which the pressure is exerted against the head of the piston 32, and when the pressure becomes strong enough it will move the piston 32 and valve 33 thereon downwardly against the pressure of the spring 17 to press the face 33a of the valve 33 against the valve seat 19 to stop the flow of gas from the chamber B to the chamber C and thereby stop the fire until the pressure of the steam reduces sufficiently that the pressure of the spring 17 plus the pressure of the gas in the chamber B will raise the valve 33 and piston 32 against the steam pressure in the chamber D whereupon the gas again flows through the pipe 24 into the chamber B and between the valve seat 19 and the valve 33 into the chamber C and then through the pipe 27 to the gas burner where the fire again builds up the steam pressure and again operates to close the valve as above described.

It appears from the foregoing description that the control valve operates to furnish an intermittent fire in the boiler, however, in reality, the valve is sensitive enough that the valve will open or close in small enough degrees that the fire is slightly increased or decreased in the proper proportion to maintain approximately a continuous uniform pressure of steam in the boiler at all times regardless of the demand made on the boiler for steam or steam pressure.

The pressure operated gas control valve may be adjusted to control the fire so as to maintain an increased or decreased pressure of steam in the boiler by screwing the adjusting screw 14 up or down to increase or decrease the pressure of the spring 17 against the valve 33 and in turn against the steam pressure in the chamber D which pressure determines the degree of opening or closing of the valve device.

As the control valve device operates, steam in the steam line 38 and the chamber D may condense and the water from the condensed steam will be deposited in the chamber C and the vertical portion of the pipe line 38. If this happens the steam pressure will be exerted against the condensed steam (water), which will in turn exert pressure as the head of the piston 32 to operate the valve 33 the same as above described.

Such modifications of my invention may be employed as lie within the scope of the appended claim without departing from the spirit and intention of the invention. Now having fully described my invention I claim:

In a pressure operated gas control valve; said valve having a pressure chamber and a pair of gas flow chambers, said pressure chamber being separated from the gas flow chambers by a pressure head plate and a flexible diaphragm positioned thereover, said flow chambers being separated by a valve and a valve seat positioned therebetween, said valve having a pressure head formed thereon and being slidably movable through said pressure head plate, and engageable by said diaphragm, said valve and valve seat being considerably larger in diameter than the pressure head on the valve, a spring, said spring being positioned under pressure intermediate the valve and the bottom of the valve housing, and means for adjusting the pressure exerted by the spring against the valve, and means for entering gas in one of said gas flow chambers and beneath the valve, and means for discharging gas from the other of said gas flow chambers, and means for entering a pressure in the pressure chamber for action on the pressure head and against the spring for the opening and closing of the valve as and for the purpose described.

CORNELIUS I. GIBBS.